United States Patent
Mackleit

(10) Patent No.: US 12,304,739 B2
(45) Date of Patent: May 20, 2025

(54) FLEXIBLE CONVEYOR SYSTEM

(71) Applicant: Western Skies Innovation, LLC, Clarkston, WA (US)

(72) Inventor: William Martin Mackleit, Clarkston, WA (US)

(73) Assignee: Western Skies Innovation, LLC, Clarkston, WA (US)

( * ) Notice: Subject to any disclaimer, the term of this patent is extended or adjusted under 35 U.S.C. 154(b) by 157 days.

(21) Appl. No.: 18/135,702

(22) Filed: Apr. 17, 2023

(65) Prior Publication Data

US 2024/0343493 A1 Oct. 17, 2024

(51) Int. Cl.
*B65G 15/08* (2006.01)
*B65G 15/42* (2006.01)
*B65G 23/06* (2006.01)
*B65G 23/12* (2006.01)
*B65G 49/05* (2006.01)

(52) U.S. Cl.
CPC ............. *B65G 15/08* (2013.01); *B65G 15/42* (2013.01); *B65G 23/06* (2013.01); *B65G 23/12* (2013.01); *B65G 49/05* (2013.01); *B65G 2207/42* (2013.01)

(58) Field of Classification Search
None
See application file for complete search history.

(56) References Cited

U.S. PATENT DOCUMENTS

| | | | | |
|---|---|---|---|---|
| 4,195,724 A * | 4/1980 | Janitsch | ................ | B65G 15/14 198/626.2 |
| 4,823,941 A * | 4/1989 | Mindich | ................ | B65G 15/08 198/821 |
| 5,247,732 A * | 9/1993 | Lait | ........................ | H01R 43/28 29/33 M |
| 5,271,583 A * | 12/1993 | Minovitch | ............... | B29C 53/74 198/804 |
| 9,381,454 B2 * | 7/2016 | Graham | ............... | B01D 33/646 |
| 9,540,174 B2 * | 1/2017 | Josserond | ............. | B65G 15/34 |

* cited by examiner

*Primary Examiner* — Kavel Singh
(74) *Attorney, Agent, or Firm* — Lee & Hayes, P.C.

(57) ABSTRACT

A conveyor mechanism and system are described that provide for conveyance of objects from a first position to a second position. The conveyor mechanism includes a torus-shaped flexible membrane having a central axis, the torus-shaped flexible membrane elongated along a direction parallel to the central axis and having an external surface, center channel, and an enclosed cavity. The conveyor mechanism also includes a first roller assembly disposed within the enclosed cavity of the torus-shaped flexible membrane, a second roller assembly that applies a force against the external surface and the first roller assembly to cause the torus-shaped flexible membrane to rotate longitudinally around the enclosed cavity to convey objects along the center channel, and an adjustment device that adjusts a position of the second roller assembly along a direction parallel with the central axis.

20 Claims, 12 Drawing Sheets

FLEXIBLE CONVEYOR SYSTEM

BACKGROUND

Materials handling systems move materials, such as objects via various conveyance mediums or mechanisms such as conveyors, lifts, and the like. Conveyance mediums or mechanisms may be used to move materials into, out of, and within a facility. In some materials handling facilities, received materials, such as objects or components, may be manufactured into other materials and objects, such as retail items. Materials, such as objects or items may be processed at processing stations in a facility. Conveyance mediums or mechanisms may transport the materials to or from a processing station.

Existing conveyance systems, such as those in manufacturing facilities, mail-order warehouses, supply chain distribution centers, airport luggage systems, and custom-order manufacturing facilities, etc., can encounter challenges in responding to different sizes, shapes, and types of material that may be requested for conveyance. Additionally, systems may need to transport irregular devices across elevation changes as well as lateral distances which existing conveyance systems are ill-equipped to provide in a manner that protects materials while also reducing complexity and cost of infrastructure systems. As inventory or manufacturing systems grow, the incorporation of conveyance systems becomes increasingly difficult to adjust and flexibly work around existing infrastructure and machinery.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
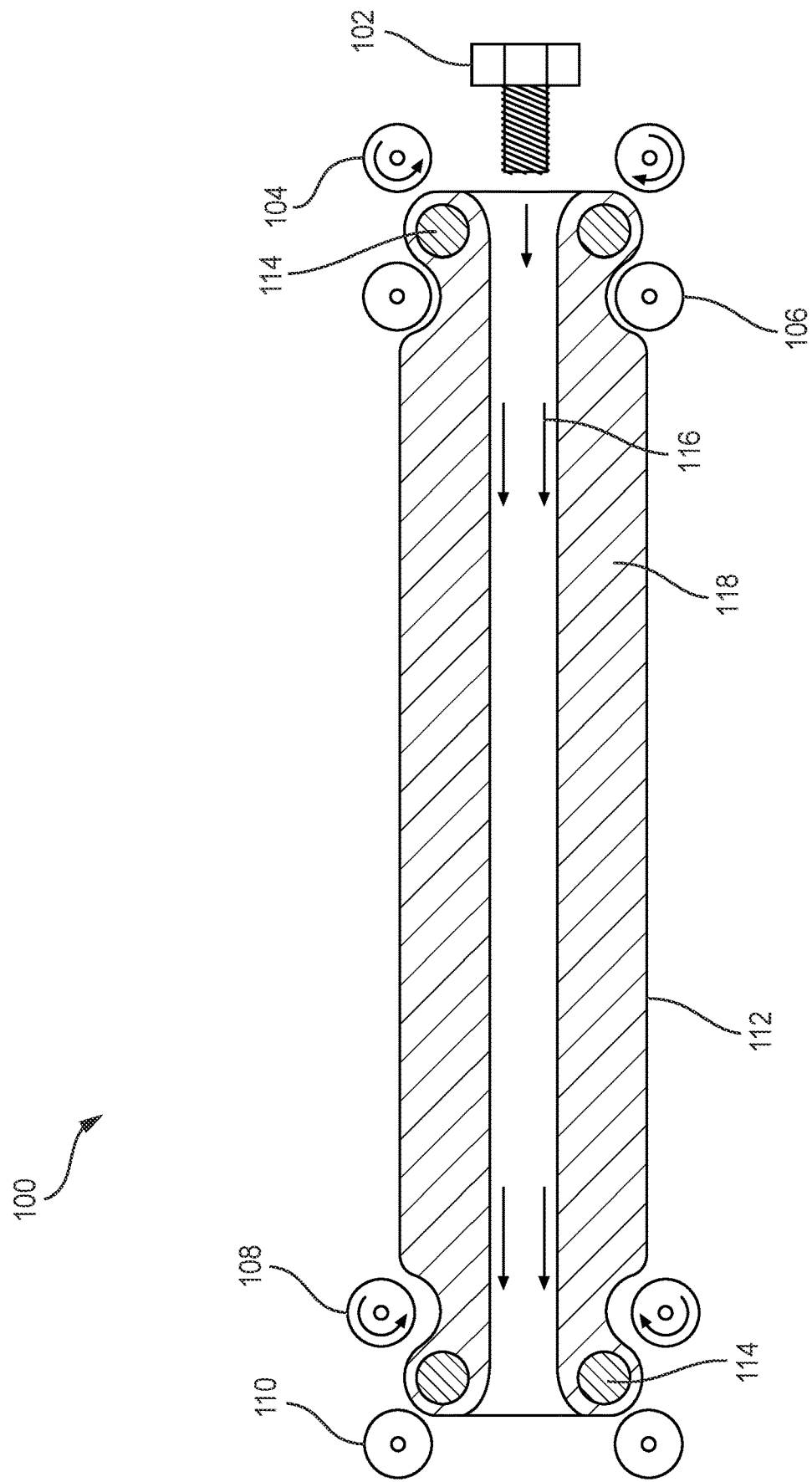
FIG. 1 illustrates a section view of a conveyor system using a torus-shaped flexible membrane for transporting objects from a first location to a second location, according to at least one example.

Systems and devices described herein are related to a material handling and conveying system that is capable of conveying irregularly shaped objects or collections of objects across a horizontal and/or vertical distance while maintaining contact and control over the objects during traversal. The conveying system described herein additionally provides for soft contact between the conveying system and the objects to be conveyed, for example to reduce force applied and potential damage or deformation to the objects during conveyance. In this manner, fragile objects or delicate objects may be conveyed over any vertical and/or horizontal distance while minimizing risk or danger of damage to the object. The conveying system described herein is configured to move a wide variety of types, sizes, and shapes of materials from one end to another with enhanced control over speed and control of the object within the system. The conveying system facilitates navigation around corners and changes elevation.

The conveying systems described herein provide the soft gripping surface described herein while also providing secure conveyance with minimal risk of the object falling off or dropping during conveyance. The soft gripping enables the conveying system to conform to the shape of the object and thereby have an increased surface area of contact between the conveying system and the objects, resulting in lower contact forces due to the increased contact area. Further, the conveying system provides for conveyance of multiple objects simultaneously, thereby providing benefits over other conveyance systems, such as pick and place robotic systems that are only capable of conveying a single object at a time.

A conveying system, as disclosed, having a flexible structure and shape between ends (e.g., between a first end and a second end) may enable the system to be added into an existing environment (e.g., retrofitting) with minimal change to the installation environment. Instead, the conveying system may be placed and configured around existing structures with minimal, if any, impact to performance of the conveying system.

The mechanical conveyor design described herein is constructed from an elongated torus shaped bladder or membrane, which provides a very simple and soft structure that has exceptional gripping abilities. The membrane may be formed of a rubber, neoprene, or other material that may have a high coefficient of friction when in contact with the object. The torus-shaped membrane is flexible and stretchable enough to allow a portion of the torus-shaped membrane compressed along the center axis (symmetric axis or longitudinal axis) to be rotated freely to the outside of the torus by rolling the membrane longitudinally around its torus shaped interior cavity. As used herein, the torus or torus-shaped is meant to describe a surface of revolution generated by revolving a shape about an axis, where the shape does not touch the axis. In some examples, the shape may be a circle or ellipse rotated about a central axis to form a donut-like shape. In some examples, the torus shape may refer to a shape rotated about the axis following a path, such as an elliptical orbit about the axis, so as to form an elliptical-shaped torus. Other such shapes and configurations are contemplated herein that may include shapes other than circles and ellipses for the cross-sections of the torus and the torus shapes. An enclosed cavity of the membrane may be filled with a fluid material that may provide for a predictable shape and/or variable pressure levels for grasping objects. The fluid may be pressurized within the torus or at atmospheric pressure depending on the gripping desired. With the fluid at atmospheric pressures the torus membrane is loose and allows objects to deform the torus with very little applied pressure. A pressurized torus may provide a more consistent grip, as internal pressure would force the membrane against different sized object along its central axis. The gripping force may depend on the resilience of the torus material, the fluid pressure, and the size of the object with relationship to the torus. All these factors can be adjusted to customize control for different gripping jobs.

As used herein, "fluid" may refer to a material that acts substantially like a fluid, such as, a gas, a liquid, solid particles, semi-solid particles, or other material that behaves like a fluid. In some particular examples, the fluid may include water, oil, air, compressed air, other gases, and other such example of fluids. In an embodiment, small particles exhibit fluid like behavior when they are made of low friction materials such as plastic beads. A low coefficient of friction allows the beads to slide pass one another and act like a fluid. Accordingly, in some examples, the beads of such a configuration may be deformable, which may increase their ability to slide past one another, thus reducing friction and allowing the beads act more like a fluid.

The torus-shaped membrane may be driven by a number of different methods or systems. In an example, a drive wheel may contact an outer portion of the membrane and cause the torus to rotate about itself such that a portion on the interior of the torus shape rotates to an exterior of the torus shape. The torus may be driven by a drive wheel or set of rollers to provide continuous motion to the torus. A roller assembly contained within the enclosed cavity of the torus may provide a resistance force against which the membrane and drive wheel may apply a force, thereby increasing the force imparted to rotating the torus-shaped membrane by the drive wheel. The actuation of the torus causes a rolling motion that results in the center portion of the membrane along the central axis of the torus sliding in the opposite direction as the outer portion of the torus membrane. Therefore, as the torus is rotated, at one end the outer surface "collapses" into the center of the torus and produces a gripping action for receiving objects and subsequently the motion of the center portion conveys the object until the object reaches the end point of the conveyor, where the object is released by the conveyor. This gripping action is produced as the torus membrane on the outer surface collapses and slides inward radially toward the collapsed central axis of the torus. The radial sliding process at the ends of the elongated torus membrane provides the gripping action for grabbing and pulling objects inside the torus.

The torus may also be manufactured in many different ways including, for example, placing one tube inside another and bonding their ends together to form a continuous surface for the torus, using a single tube and threading one end down the center of the tube and sealing the two ends together, or blow molding the torus shape in a mold.

In an example, a conveyance system is described that includes a conveyor component having a torus shape elongated along a central axis of the torus shape, the conveyor component may include a flexible membrane forming the torus shape, where the flexible membrane is configured such that a first portion of the flexible membrane is configured to rotate from an interior surface of the torus shape to an exterior surface of the torus shape. The conveyance system also includes a first roller assembly situated within a cavity enclosed by the flexible membrane and a second roller assembly situated within the cavity. The conveyance system further includes a first end unit having a drive shaft configured to receive an input torque, a drive wheel coupled to the drive shaft and configured to rotate in response to the input torque, the drive wheel configured to apply a force against the conveyor component and the first roller assembly, and a first adjustment device that adjusts a position of the drive wheel along a direction parallel with the central axis. A second end unit of the conveyance system may include a retainer wheel that contacts the flexible membrane and applies a force against the flexible membrane and the second roller assembly and a second adjustment device that adjusts a position of the retainer wheel along the direction parallel with the central axis.

In some examples, the conveyance system may include one or more of the following features. The cavity enclosed by the flexible membrane may include a fluid that fills or partially fills the cavity and/or causes the pressure within the cavity to be greater than or equal to an environmental pressure outside the cavity. The conveyor component may be enclosed by a conduit tube that extends from the first end unit to the second end unit. The conduit tube may include a bearing surface disposed on an interior of the conduit tube, the bearing surface configured to contact the conveyor component and reduce friction between the conduit tube and the conveyor component. In some examples, the drive wheel may include a first engagement surface having first engagement features and the conveyor component may include a second engagement surface having second engagement features configured to interface with the first engagement features. For instance, the drive wheel may include a timing belt wheel while the conveyor component has corresponding shapes configured to engage with the timing belt wheel, such as a timing belt applied to the surface of the membrane such that the timing belt wheel causes rotation of the torus shape. The conveyor component may include a plurality of fins arranged on the flexible membrane, individual fins of the plurality of fins perpendicular to the central axis of the conveyor component. The fins may be used for capturing loose items or fluid-like items such as grain, sand, or other particulate or loose material. The fins may prevent the loose material from rolling back against the direction in which the conveyor component is carrying the material, for example to prevent grain from falling down within the central portion when the conveyor component traverses a vertical distance. In some examples, the first roller assembly may include a ring having a plurality of roller surfaces arranged around a perimeter of the ring and the second roller assembly may have a similar and/or identical structure. The first end unit further may include a second drive wheel connected to the drive shaft and the drive wheel, where the second drive wheel is configured to contact the conveyor component. In some examples, the torus-shaped flexible membrane may have a textured surface for improved wear and gripping characteristics. A knobby surface with a pattern of bumps may provide improved grip and improved wear resistance, while a wear-resistant fabric may be used to cover the membrane for gripping abrasive objects.

The description provided herein enables numerous uses for such a conveyor system. For example, such a conveyor system may be used to convey fruit without bruising, transport grain into a grain elevator without creating excess dust and/or explosion hazard, move components within a factory for assembly from one part of an assembly line to another, and other such uses. The soft, even pressure from the torus-shaped membrane produces no pressure points on objects, which enables it to transport delicate items without a risk of damage to the items. The conveyor system may also transport items and/or collections of items that may be difficult to transport through other conveyor systems. For example, the conveyor system described herein may easily transport bolts having a variety of shapes and sizes in any quantities from one location to another within a factory setting. The conveyor system is also position and orientation agnostic for objects it conveys. The position and orientation tolerance and orientation tolerance enables the conveyor system to operate more quickly and efficiently than other systems, such as systems that rely on robotic arms and graspers.

Although the description provided herein includes numerous examples, these should not be viewed as limiting the scope of the invention. Instead, the description should be considered as illustrations of some of the embodiments of this conveyor system. The present description provides an overall understanding of the principles of the structure, function, manufacture, and use of the systems and methods disclosed herein. One or more examples are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Additional details are described below with reference to several example embodiments. Turning now to the figures, FIG. 1 illustrates a section view of a conveyor system 100 using a torus-shaped flexible membrane for transporting an object 102 from a first location to a second location, according to at least one example. The conveyor system 100 is shown having a particular length in FIG. 1, though any length or distance may be imagined between the ends of the conveyor system 100. The conveyor system 100 includes drive wheels 104 and 108, idler wheels 106 and 110, a membrane 112, and roller assemblies 114.

The membrane 112 has an elongated torus shape, viewed in section view with a section taken along a central axis of the torus (e.g., along direction 116). The membrane 112 provides a very simple and soft structure that has exceptional gripping abilities. The membrane 112 may be formed of a rubber, neoprene, plastic, or other flexible material capable of forming the torus shape and rotating as described herein. In some examples, the membrane 112 may be formed of a material that has a high coefficient of friction when in contact with the object. The membrane 112 is flexible such that the torus-shape of the membrane rotates to cause an exterior portion of the membrane 112 to rotate to an interior portion, as driven by the drive wheels 104 and 108. The membrane 112 is flexible and stretchable enough to allow a portion of the membrane 112 compressed along the center axis (e.g., along direction 116) to be rotated freely to the outside of the torus by rolling the membrane longitudinally around the torus shaped interior cavity (e.g., volume, void, space, hollow area, etc., within the torus shape).

The membrane 112 encloses a cavity 118 within the membrane 112. The cavity 118 may be filled with a fluid material that may provide for a predictable shape and/or variable pressure levels for grasping objects. The fluid may be pressurized within the torus or at atmospheric pressure depending on the gripping desired. With the fluid at atmospheric pressures the membrane 112 is loose and allows objects to deform the torus with very little applied pressure. A pressurized membrane 112 may provide a more consistent grip, as internal pressure would force the membrane 112 against different sized object along its central axis. The gripping force may depend on the resilience of the material forming the membrane, the fluid pressure, and the size of the object with relationship to the torus. All these factors may be adjusted to customize control for different gripping jobs based on application. The fluid filling the cavity 118 may include a gas, a liquid, solid particles, semi-solid particles, or other material that behaves like a fluid. Small particles exhibit fluid like behavior when they are made of low friction materials such as plastic beads. A low coefficient of friction allows the beads to slide past one another and act like a fluid. In some examples, the beads of such a configuration may be deformable, which may increase their ability to slide pass one another, thus reducing friction and allowing the beads to act more like a fluid. In an example, the fluid within the cavity 118 may be an oil that coats the entire inner surface as the torus rotates to reduce wear due to friction of the torus membrane against itself.

As the membrane 112 is rotated, due to the driving wheels 104 and/or 108, the membrane 112 rotates the torus such that the center portion of the torus advances along direction 116 while the external portion of the torus proceeds in a direction opposite to direction 116. The center portion of the torus may therefore transport the object 102 in the direction 116 as the membrane 112 is driven.

The membrane 112 may be driven by a number of different methods or systems. In the example illustrated in FIG. 1, the membrane 112 is driven by drive wheels 104 and/or 108. In some examples, one of the sets of drive wheels 104 or 108 may be replaced by a set of idler wheels such that only one of the sets of drive wheels 104 or 108 is used to drive the membrane 112. In some examples, the membrane 112 may be driven by only one set of drive wheels, either drive wheels 104 or drive wheels 108. In some examples, both sets of drive wheels may be used to drive the ends of the conveyor component formed by the membrane 112 at the same speed. The drive wheels 104 and/or 108 contact the outer surface of the membrane 112 and causes the torus to rotate about itself such that a portion on the interior of the torus shape rotates to an exterior of the torus shape. The torus may be driven by the drive wheels 104 and/or 108 or set of rollers to provide continuous motion to the torus. The drive wheels 104 and/or 108 may be driven by an input force, such as through a drive shaft connected to a rotating source such as a motor that applies a torque to the drive shaft causing the drive wheels 104 and/or 108 to rotate. The drive wheels 104 and/or 108 may be driven in either direction to change direction of the conveyor system 100 based on whether the object 102 is conveyed along direction 116 or in a direction opposite direction 116.

The idler wheels 106 and/or 110 may be free to rotate, meaning not driven by a motor or other torque applied to the drive wheels 104 and/or 108. The idler wheels 106 are positioned such that the roller assembly 114 is contained between the drive wheels 104 and the idler wheels 106. In this manner, the roller assembly 114, positioned within the enclosed cavity 118 of the torus, maintains the end of the conveyor component in contact with the drive wheels 104. Similarly, the idler wheels 110 are positioned proximate to the drive wheels 108 and the roller assembly 114 such that the opposite end of the conveyor component (e.g., membrane 112 and/or torus) is retained in position and driven by the drive wheels 104 and/or 108.

The roller assemblies 114 contained within the enclosed cavity of the torus may provide a resistance force against which the membrane 112 and drive wheels 104 and/or 108 may apply a force, thereby ensuring that the membrane 112 is rotated by the drive wheels 104 and/or 108. The roller assemblies 114 also serve to increase the force imparted to rotating the torus-shaped membrane 112 by the drive wheels 104 and/or 108 by sandwiching the roller assemblies between the respective drive wheels 104 or 108 and idler wheels 106 or 110. The actuation of the torus causes a rolling motion that results in the center portion of the membrane 112 along the central axis of the torus sliding in the opposite direction as the outer portion of the torus membrane. Therefore, as the torus is rotated, at one end the outer surface "collapses" into the center of the torus and produces a gripping action for receiving objects and subsequently the motion of the center portion conveys the object until it reaches the end point of the conveyor, where it is released by the conveyor system 100. This gripping action is produced as the torus membrane on the outer surface collapses and slides inward radially toward the collapsed central axis of the torus. The radial sliding process at the ends of the elongated torus membrane provides the gripping action for grabbing and pulling objects inside the torus. The roller assemblies 114 are shown and described in further detail with respect to FIGS. 5-6 and 14.

The torus formed by the membrane 112 may be manufactured in many different ways including, for example, placing one tube inside another and bonding their ends together to form a continuous surface for the torus, using a single tube and threading one end down the center of the tube and sealing the two ends together, or blow molding the torus shape in a mold. One example is shown and described with respect to FIGS. 5-9.

In FIG. 1 the torus formed by membrane 112 is being driven by drive wheels 104 and/or 108 to grasp object 102. An annular housing at the first end and the second end, such as a first end unit and a second end unit is not shown in FIG. 1 for clarity of the drawing, but is illustrated and described with respect to FIGS. 2 and 10-13. The drive wheels 104 and 108 as well as the idler wheels 106 and 110 mount to the housings at locations along the housing and maintain the drive wheels 104 and 108 as well as the idler wheels 106 and 110 in position, as well as provide for entrance and exit positions of the conveyor system 100.

The roller assembly imparts motion to the torus by friction contact of a set of drive rollers. These drive wheels 104 and/or 108 are pressed against the torus by roller assemblies within the torus. The torus is kept from sliding backward by the idler wheels 106 and 110 because the diameter spacing of the idler wheels 106 and 110 is smaller than the diameter of the torus.

Figure 2:
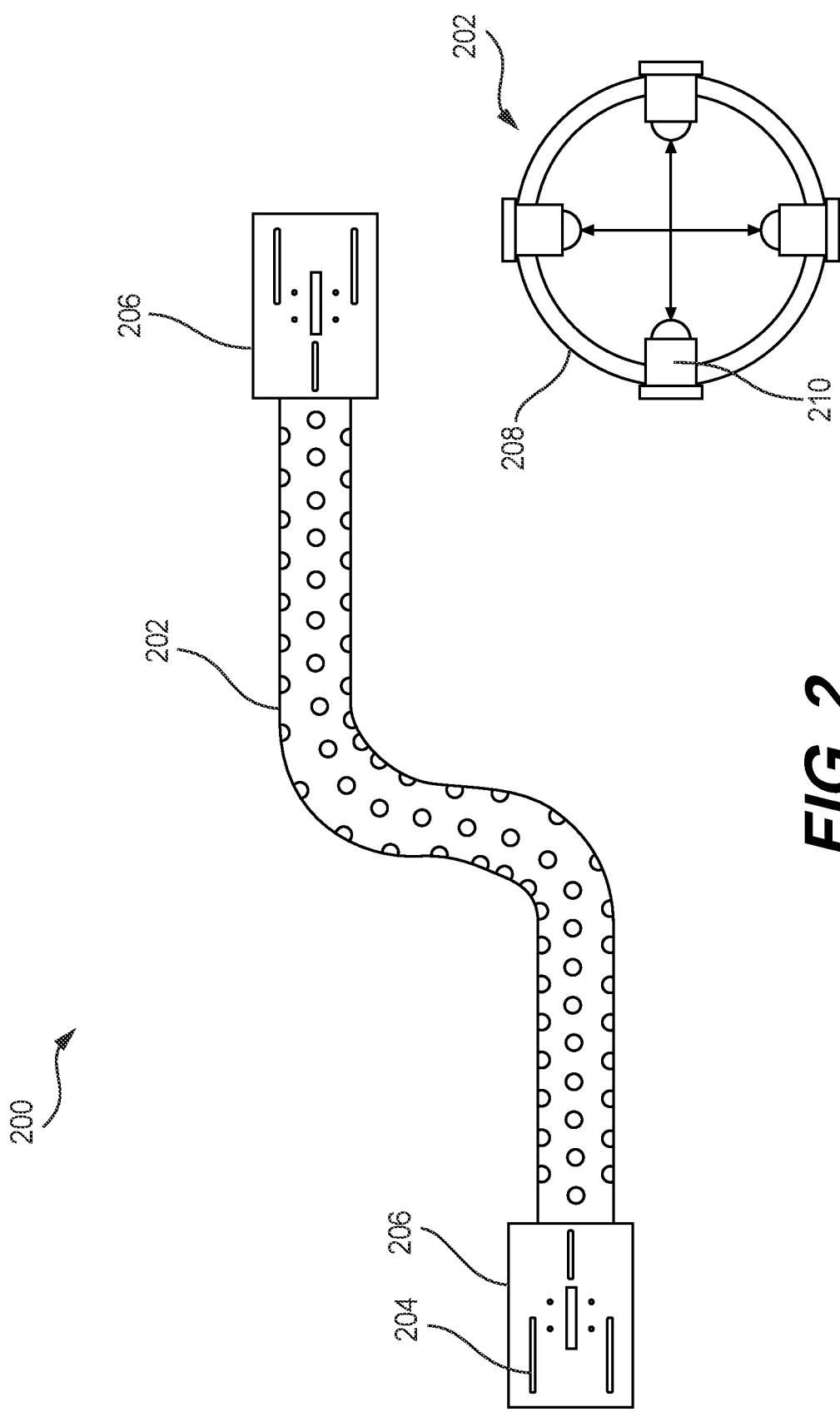
FIG. 2 illustrates an example of a conduit that may be used for providing a bearing surface and guiding the conveyor system of FIG. 1 along a particular route, according to this disclosure.

FIG. 2 illustrates an example of a conveyor system 200 including a conduit 202 that has a bearing surface and that guides the torus described in FIG. 1 along a particular route, according to this disclosure. The conveyor system 200 includes the conduit 202, end units 206, and adjustment mechanisms 204.

The conduit 202 may include a rigid or semi-rigid housing that surrounds the torus-shaped member of the conveyor system (not shown in FIG. 2) and guides the conveyor system along a particular path, for example to enable particular corners and/or locations for the conveyor system 200 to traverse. In this manner, the conduit 202 enables the conveyor system 200 to be retrofit or installed around other components or machinery or structures without requiring complex conveyor geometries and components. Instead, the conveyor system 200 enables an object to be transported across paths that may not be possible through other conveyance systems. In some examples, the conduit 202 may fully enclose the membrane portion of the conveyor. In some examples, the conduit 202 may only partially enclose or partially surround the membrane of the conveyor system.

A cross-section of the conduit 202 is illustrated in FIG. 2 showing bearings 210 to provide for low-friction interfaces between the torus and the interior surface of the conduit 202. In some examples, the conduit 202 may be formed of a plastic, metal, or other rigid or semi-rigid material. The conduit 202 may have a low-friction inner surface, for example by polishing the surface, applying a coating such as a Teflon®, or other such low-friction coating, and/or by including bearings 210. The bearings 210 may include stud bearings that include a ball bearing or other bearing surface held in place in a socket fixed to or through the wall of the conduit 202. In an example, conduit may be shaped for a particular location, and after shaping, holes may be drilled in the walls of the conduit 202 where such stud ball bearings may be inserted. Though depicted in FIG. 2 as arranged uniformly around the conduit 202, in some examples, the bearings 210 may be inserted and/or applied only in particular locations, such as on a bottom side of the conduit, at corners or curves, or other locations where the torus-shaped membrane of the conveyor system 200 is anticipated to contact the walls of the conduit 202 during operation.

The end units 206 may include the annular housing at the first end and the second end of the conveyor system 200, such as a first end unit and a second end unit. The end units provide for the drive wheels 104 and 108 as well as the idler wheels 106 and 110 to mount to and maintain the position of the ends of the conveyor system as well as to couple the conduit 202 and other components to. The end units 206 also include entrance and exit positions of the conveyor system 200. The end units 206 further include adjustment mechanisms 204, shown in FIG. 2 as slots in the housing of the end units. The adjustment mechanisms 204 may provide for adjustment of the positioning of the drive wheels and idler wheels to adjust and provide for tensioning adjustment of the membrane 112. By sliding the mounting location of the drive wheels and idler wheels towards a distal end of the end unit, the tension in the system may be increased, which may be used for conveying smaller objects while the tension may be reduced to accommodate larger objects that will stretch the membrane to a greater extent than the smaller objects would. In some examples, the end units 206 may be electrically grounded such that any static buildup during operation of the conveyor system is discharged. In this manner, the conveyor system may be implemented in environments that may require sparkless components, such as environments with high dust content including grain delivery environments.

Figure 3:
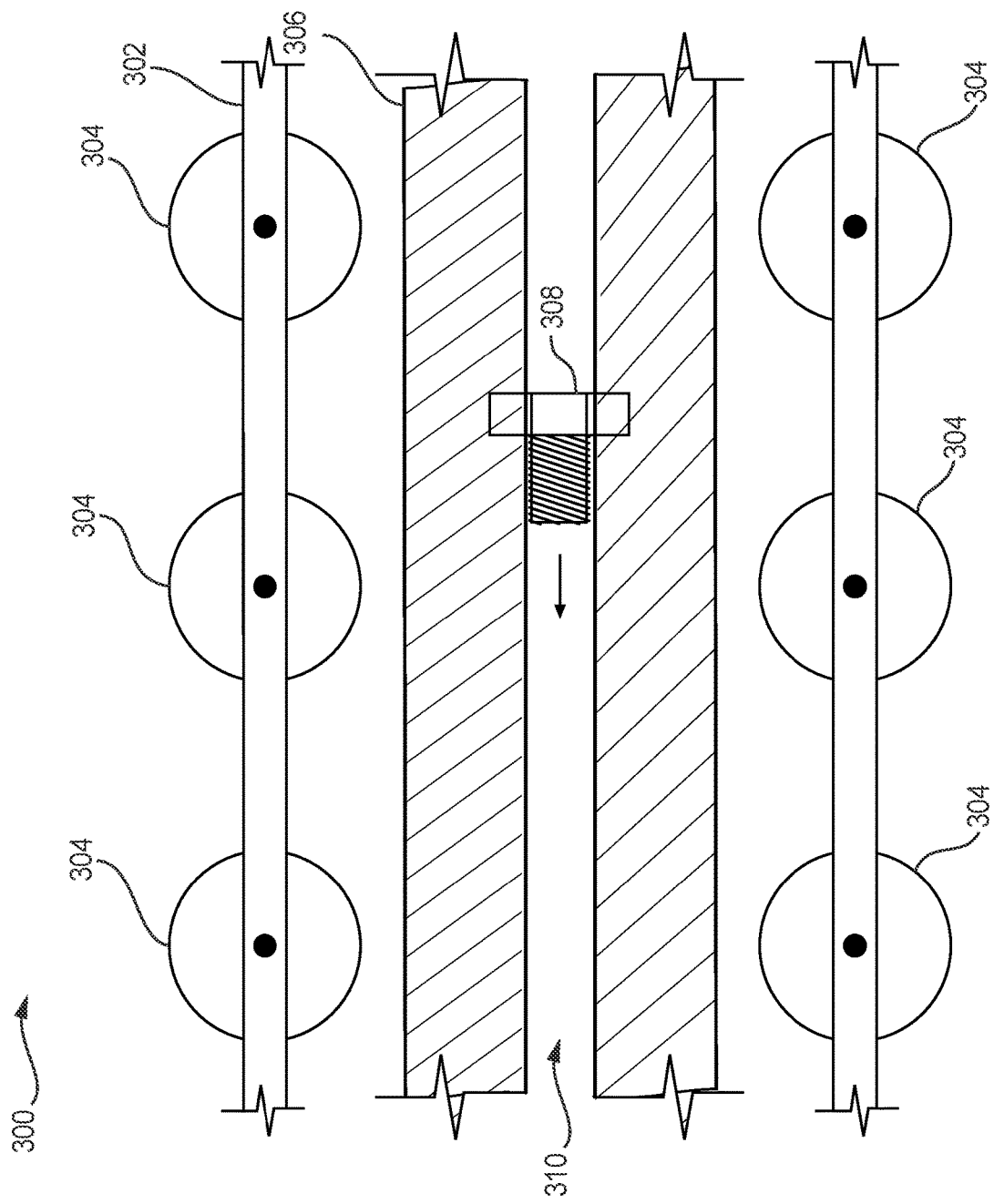
FIG. 3 illustrates an example of a component conveyed by the conveyor system within the conduit, according to this disclosure.

In FIG. 3 a conveyor system 300 is illustrated with a torus 306 positioned within a conduit 302 while transporting an object 308. The torus 306 is in contact with the object 308. The drive wheels of FIG. 1, cause torus 306 to rotate by direct contact with the rollers. When rotating in the direction shown, torus 306 will grip object 308 as it contacts object and begins to pull object 308 into the center channel 310 portion of the torus 306. As the torus 306 continues to rotate, object 308 moves even further into the center channel 310. If the drive wheels continues to rotate torus 306, object 308 will be ejected out the exit end of the conveyor system 300 at a destination.

The conduit 302 and the bearings 304, illustrated as ball bearings pinned within the walls of the conduit 302, maintain the torus 306 in position as objects are transported during operation. For example, the object 308 may cause the torus 306 to sag, and the conduit 302 and bearings 304 will maintain the torus 306 in the position for the route of the conveyor system 300 as established rather than allowing any significant deviation from the path.

In the configuration described herein, the conveyor system 300 grips the object 308 and transports the object 308 (and other objects) to the other end of torus 306. The torus gripper allows it to transport objects in ways other conveyers cannot. In FIG. 3 an object may be gripped and transported in either direction along the center channel 310 through torus 306 depending on which way the torus is being rotated by roller assemblies. In FIG. 3 the torus 306 is shown rotating in the direction to grip objects on the right side of the torus and transport them towards the left end of the torus 306. If the direction of rotation for the roller assemblies is reversed the objects may be transported in the opposite direction (left to right).

In some examples, multiple conveyor systems 300, such as the conveyor system 100 may be used in segments to transport the object 308. For example, the conveyor systems 300 may be positioned end to end with individual drive systems for each segment. Accordingly, the segments may be operated independently from one another. In a factory setting, where objects may be components for assembly, an overall conveyor system may include a large number of components, by having multiple segments, one or more segments may be operated independently and/or sped or slowed down based on the desired pace of objects to be delivered at a destination. For instance, a first machine may produce components at a first rate. The objects may be picked up at a first end of the conveyor system. The components may be consumed at a different rate at the second end of the conveyor system. Accordingly, a first segment of the conveyor system may operate at a first speed while a second segment operates at a second speed. In this manner, the object may be delivered at the desired rate. This variable rate for the different segments may be used to change the spacing or distance between objects within the conveyor system as well as adjust the rate as described herein.

In some examples, one or more sensors at the entrance and/or exit of the conveyor systems may detect the spacing of objects within the conveyor system and may cause the conveyor system to adjust speed accordingly to deliver the objects at a particular pace or rate. For example, in response to detecting the object by the sensor, the conveyor system may stop the torus from moving and hold the object in place between different segments of the conveyor system for a user to remove manually. In some examples, the gap between the segments of the conveyor may include an actuator that may push the object 308 out of the gap before it enters the second segment of the conveyor. In this manner, a conveyor system of segments of torus-shaped conveyors may be used to deliver objects to an assembly line where multiple assemblies are prepared simultaneously (e.g., for multiple instances of the same component being added to separate assemblies at the same time).

The one or more sensors, when combined with encoded motors, position sensors detecting positions of the membrane, and servo technology enables a system to track a location within the conveyor system for multiple different objects over time. Tracking such objects may enable precise delivery, with respect to time and position of deliver. For example, in a system with multiple segments of conveyors, speeding up or slowing down adjacent sections of the conveyor system may enable objects to be more tightly packed along the length of the conveyor or to increase a gap between objects as they are conveyed. In some examples, one or more of the end units may be positionable by a robotic arm or other positioning system such that the end unit, or start unit for the convey may pick up or deliver items to or from specific locations without the objects being fed into the end unit at a single location or exiting at a single location.

Figure 4:
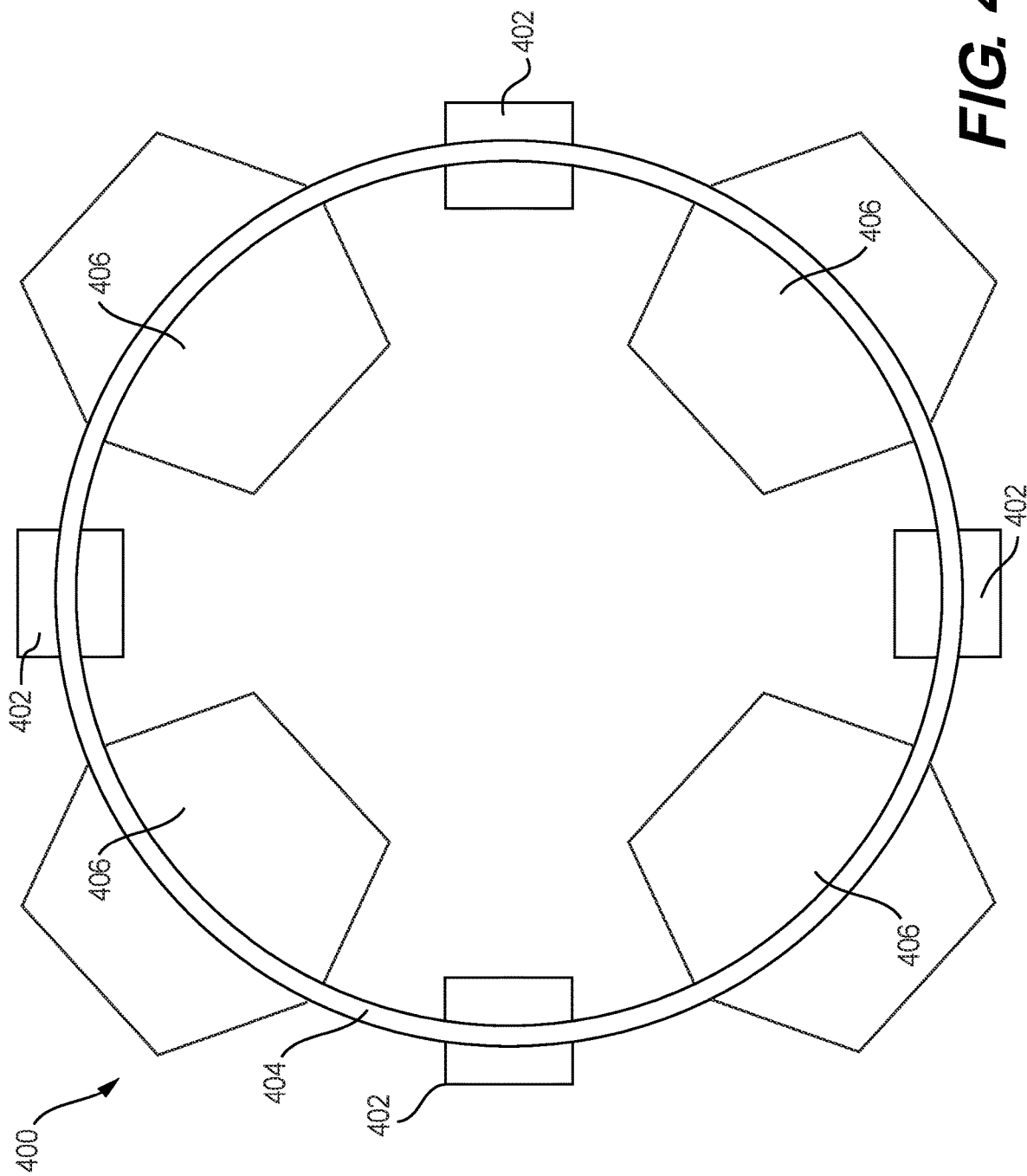
FIG. 4 illustrates an example of a torus-shaped membrane of a conveyor component including fins and engagement surfaces for driving the membrane, according to this disclosure.

FIG. 4 illustrates an example of a torus 404 formed of membrane 400 of a conveyor component including fins 406 and engagement surfaces 402 for driving the membrane 400, according to this disclosure. The membrane 400 is shown with an inner surface of the torus 404 having fins 406 and engagement surfaces 402 on an interior of the torus shape while the outer surface also has fins 406 and engagement surfaces 402, though positioned on an exterior surface of the torus. As the membrane 400 advances, as described herein, the fins 406 will migrate from the exterior surface to the interior surface, likewise with the engagement surfaces 402.

Though the torus 404, and other torus-shapes described herein, is shown having a circular cross-section, in some examples, the torus 404 or other torus-shapes may have other cross-sectional shapes. For example, the torus 404 and/or the torus-shape for the membrane 112 may have an oval or elliptical cross-sectional shape. Such a shape may enable the system to handle flat, plate, or other materials having a high aspect ratio without requiring the torus 404 to have a large diameter, instead, only a major axis of an elliptical cross-section may be sized to handle the high aspect ratio material while a minor axis of the elliptical cross-section may be reduced, thereby reducing the size and profile of the torus 404 and also ensuring that the torus 404 will be able to grip and convey such materials. In some examples, the torus 404 or other torus-shapes described herein may have other cross-sectional shapes such as geometric and non-geometric shapes including square, elliptical, rectangular, or other such profiles.

The fins 406 may extend part-way or across the entire diameter of the interior of the torus 404. The fins 406 are shown with four evenly spaced fins having trapezoidal shapes. In some examples, there may be more or less than four fins 406 and the fins 406 may be spaced differently and/or shaped differently based on an intended purpose. The fins 406 may be arranged such that they are perpendicular to the central axis of the torus 404. The fins 406 may be used for capturing loose items or fluid-like items such as grain, sand, or other particulate or loose material. The fins 406 may prevent the loose material from rolling back against the direction in which the conveyor component is carrying the material, for example to prevent grain from falling down within the central portion when the conveyor component traverses a vertical distance. In this manner, the conveyor system may be configured to transport objects and materials such as dirt, grain, liquids, or other such loose materials. For example, the conveyor system may be implemented as a grain elevator for delivering grain.

The engagement surfaces 402 of the torus 404 may include teeth or other textural protrusions that provide for positive engagement with the drive wheels that cause rotation of the torus 404. The engagement surfaces 402 may have a first profile while the drive wheels have a second profile that complements the first profile. For instance, the drive wheel may include a timing belt wheel while the engagement surface 402 includes a timing belt applied to the surface of the membrane such that the timing belt wheel causes rotation of the torus 404.

Figure 6:
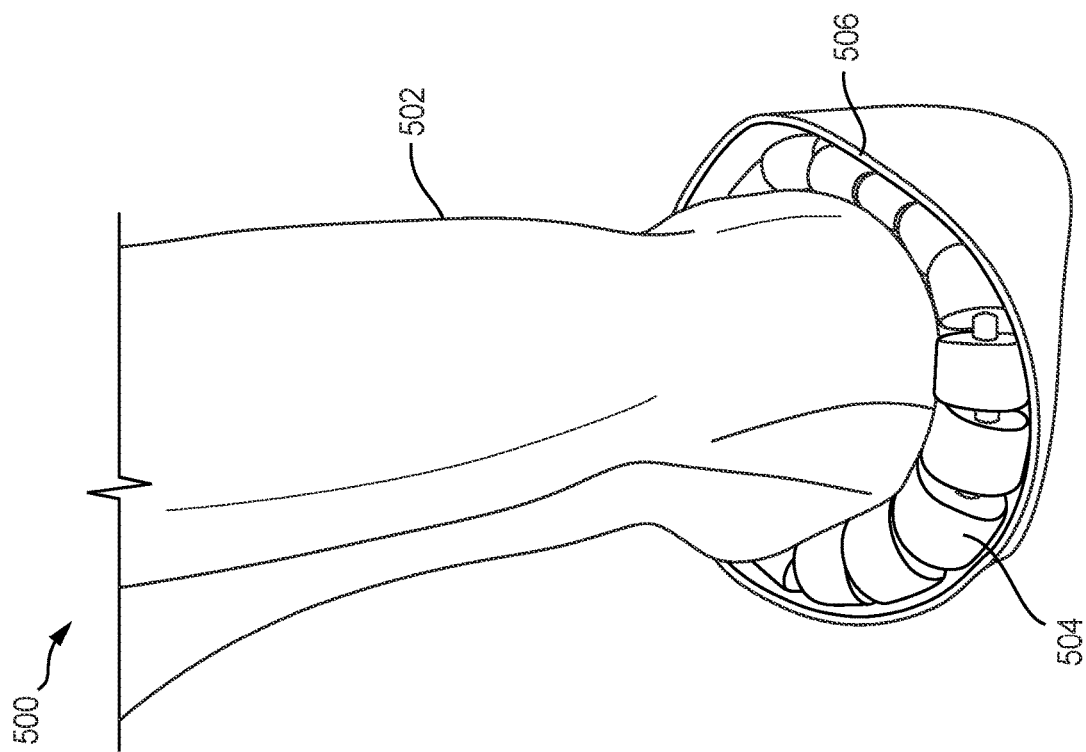
FIGS. 5-7 illustrate an example for inserting a roller bearing within an enclosed cavity of the torus shape, according to this disclosure.
Figure 5:
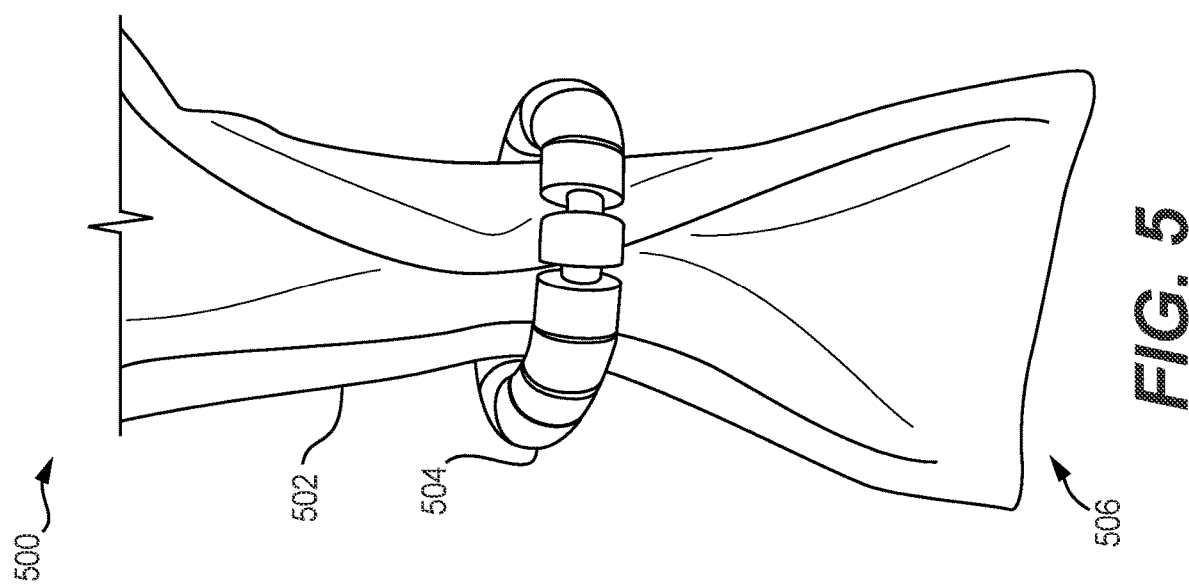
Figure 7:
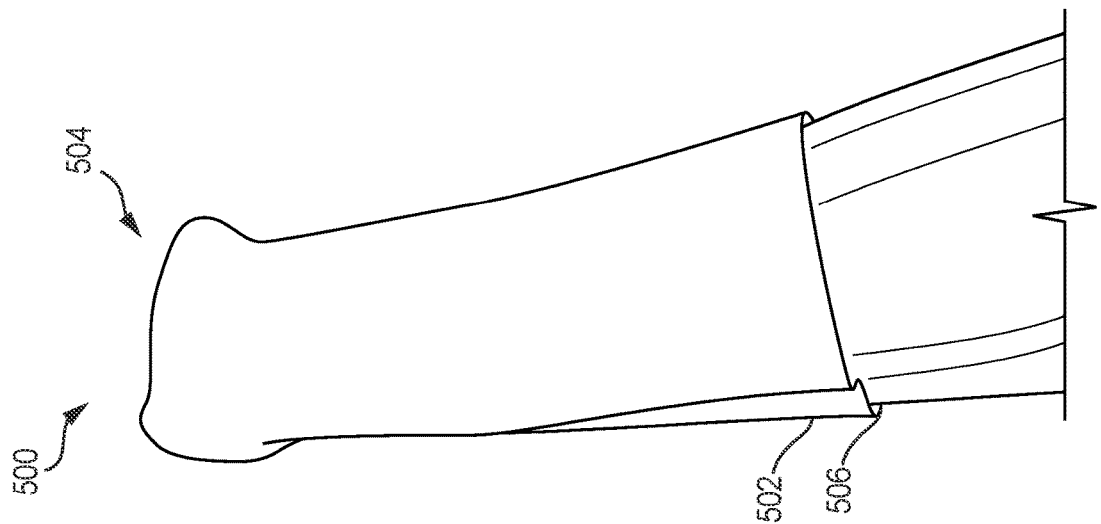

FIGS. 5-7 illustrate an example 500 for inserting a roller bearing within an enclosed cavity of the torus shape, according to this disclosure. In FIGS. 5-7, a roller assembly 504 is positioned with the membrane 502 passing through a center of the roller assembly 504. The roller assembly is illustrated as a ring with a plurality of rollers or roller bearings around the perimeter of the ring. This configuration may enable the roller assembly 504 to interface with the membrane 502, drive wheels, and idler wheels and enable rotation of the torus formed by the membrane 502 as described herein. Other shapes and configurations of roller assemblies may also be implemented, including for example, as described with respect to FIG. 14.

After the first end 506 of the membrane 502 passes through the center of the roller assembly 504, the first end 506 is doubled back on the outside of the roller assembly 504 as depicted in FIG. 6. Subsequently, the first end 506 is pulled along the length of the membrane 502 to form an enclosed cavity with the roller assembly 504 captured within the torus shape subsequently formed as depicted in FIG. 7. A similar process may occur at a second end of the membrane 502 with a second roller assembly for an opposite end. The first end 506 and the second end may then be fused together through stitching, adhesive, melting, or other joining mechanisms to form the torus with the roller assemblies enclosed within.

Figure 8:
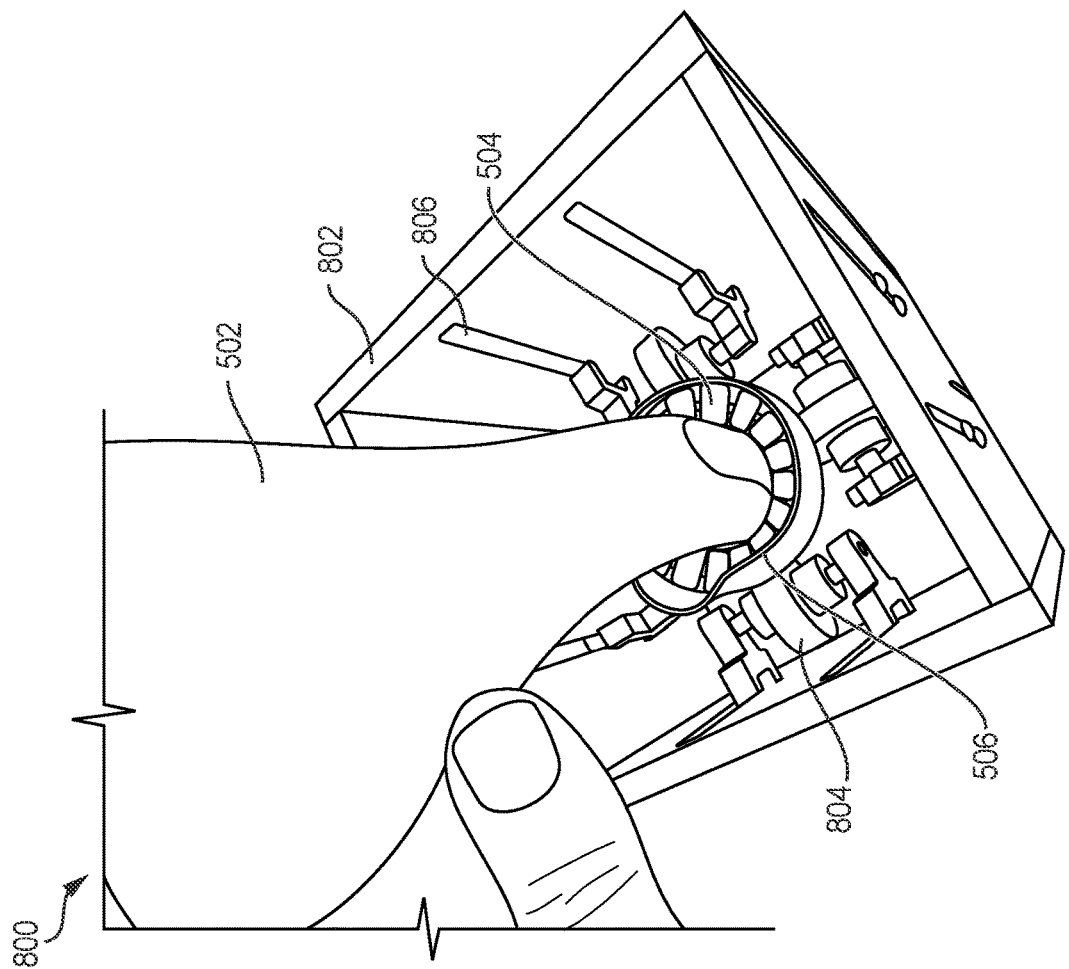
FIGS. 8-9 illustrate an example of coupling the flexible membrane with an end unit, according to this disclosure.
Figure 9:
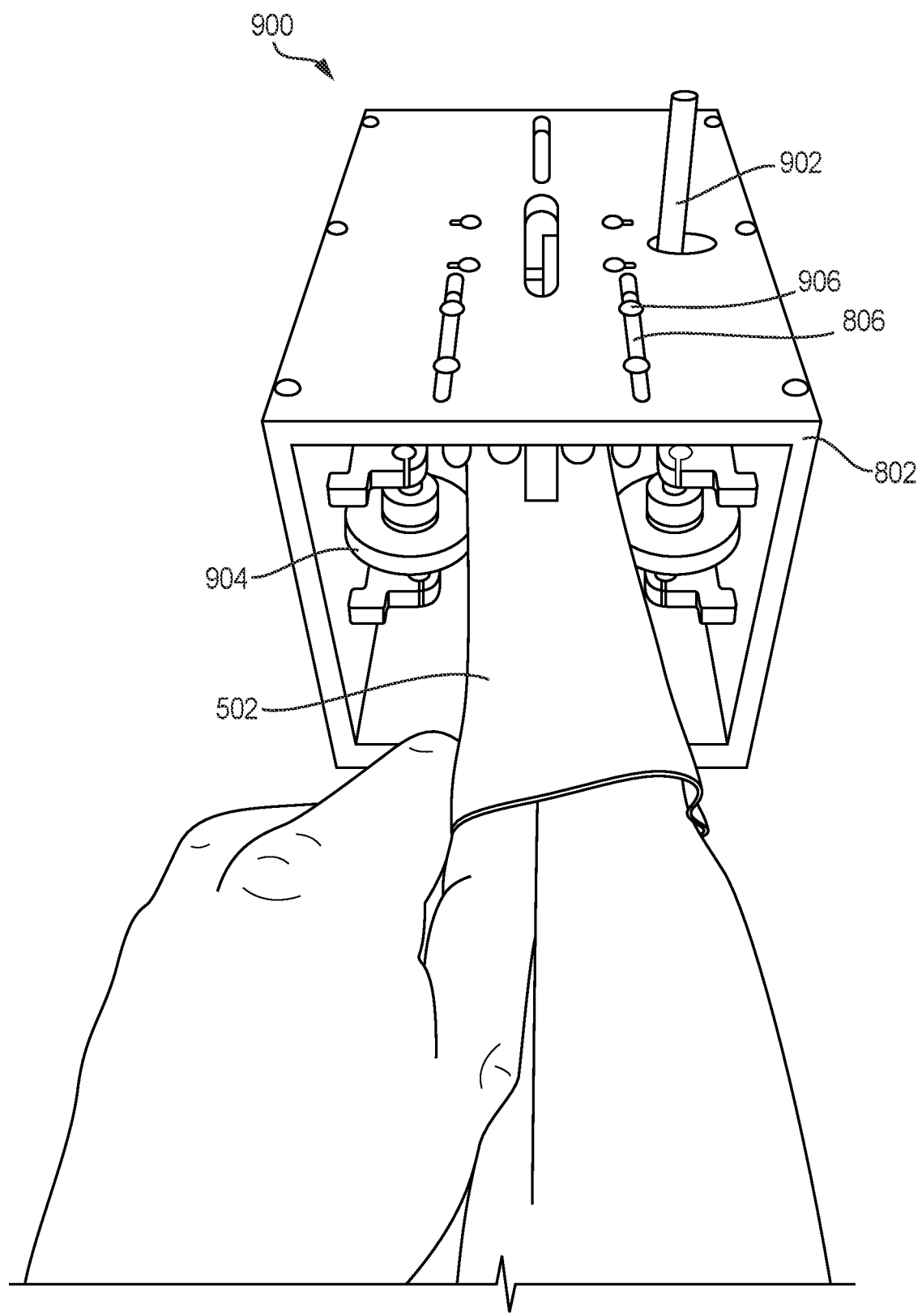

FIGS. 8-9 illustrate an example of coupling the flexible membrane with an end unit, according to this disclosure. In FIG. 8, the membrane 502 with the roller assembly 504 installed therein may be inserted into an end unit 802. The end unit 802 includes idler wheels 804 and adjustment slots 806. The adjustment slots enable the idler wheels 804 to be positioned within the end unit 802, specifically along the direction of the central axis of the membrane 502 to adjust a tension of the membrane 502 when installed.

In FIG. 9, the drive wheels 904 are installed such that the roller assembly 504 is positioned and held in place between the idler wheels 804 and the drive wheels 904. The drive wheels 904 may be positioned using adjustment slots 806 with mounting points 906 used for coupling the idler wheels 804 and the drive wheels 904 to the end unit 802. The spacing between the idler wheels 804 and the drive wheels 904 may be adjusted using the adjustment slots 806 to account for the thickness of the membrane 502. Additionally, the adjustment slots 806 may be used to adjust a force between the drive wheels 904 and the membrane 502. As the drive wheels 904 are brought closer to the idler wheels, the force on the roller assembly 504 and membrane 502 increases, which may increase force transferred to the membrane 502 from the drive wheels 904. The drive wheels 904 are coupled to a drive shaft 902 that is used to receive an input force such as a torque from a motor and to drive one or more of the drive wheels 904 within the end unit 802.

Figure 10:
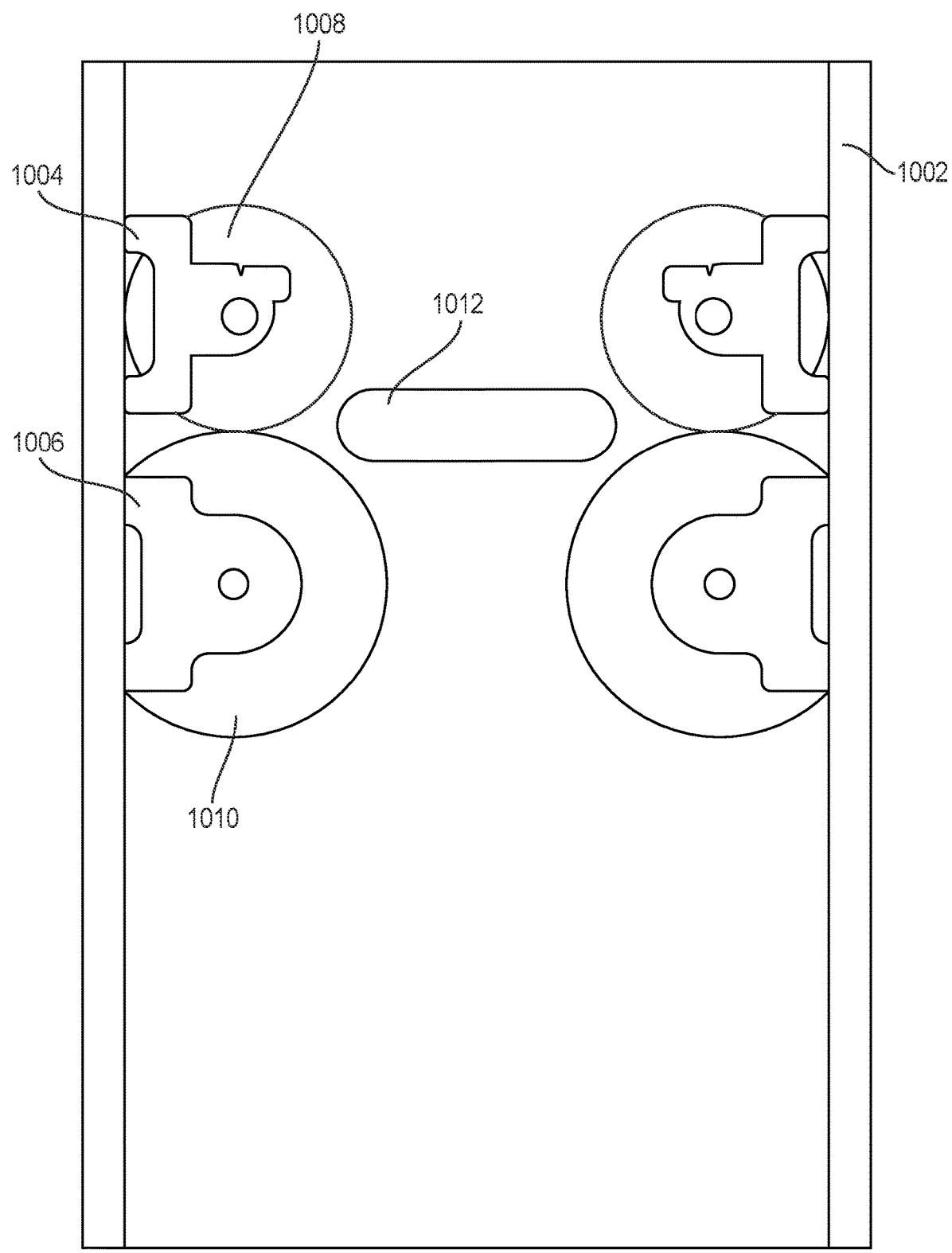
FIG. 10 illustrates an example side view of an end unit illustrating contact wheels and bearings for driving the flexible membrane, according to this disclosure.
Figure 11:
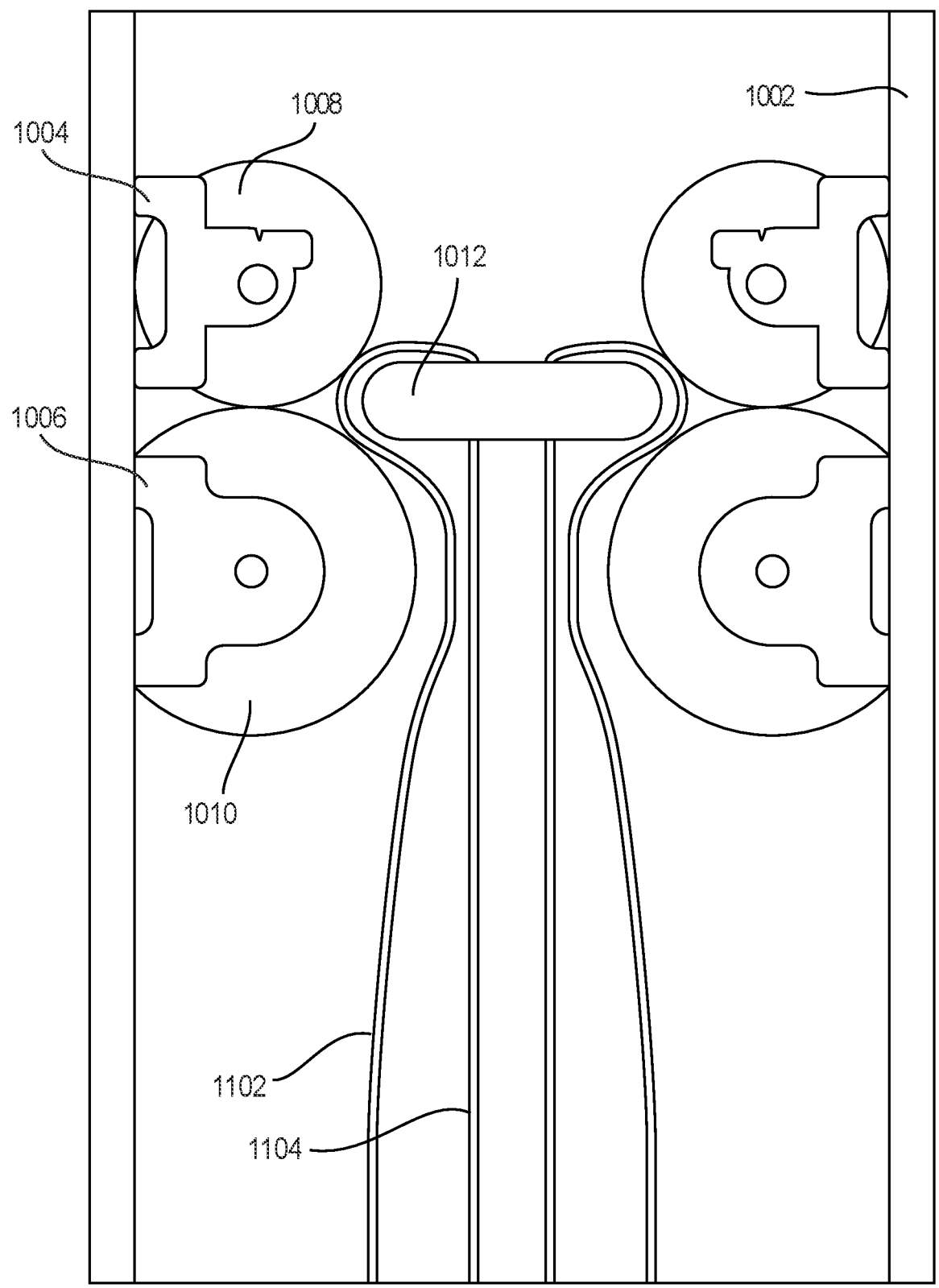
FIG. 11. illustrates an example side view of an end unit illustrating contact wheels and bearings for driving the flexible membrane, according to this disclosure.

FIGS. 10 and 11 illustrate an example side view of an end unit illustrating contact wheels and bearings for driving the flexible membrane, according to this disclosure. As described herein, the end unit 1002 includes mounting structures for the idler wheels 1008 and drive wheels 1010 that may move along adjustment slots to capture the roller assembly 1012 between the idler wheels 1008 and the drive wheels 1010. In an example, the end unit may include four sets each of drive wheels 1010 and idler wheels 1008 such that the roller assembly 1012 is captured and balanced in place in the end unit 1002.

As depicted in FIG. 11, the outer surface 1102 of the torus contacts the drive wheels 1010 that cause the torus to rotate. The outer surface 1102 is contacted between the roller assembly 1012 and the drive wheel 1010. The outer surface 1102 also contacts the idler wheel 1008 before returning through a center of the roller assembly 1012 to become the inner surface 1104 where objects are conveyed along the length of the conveyor system.

Figure 12:
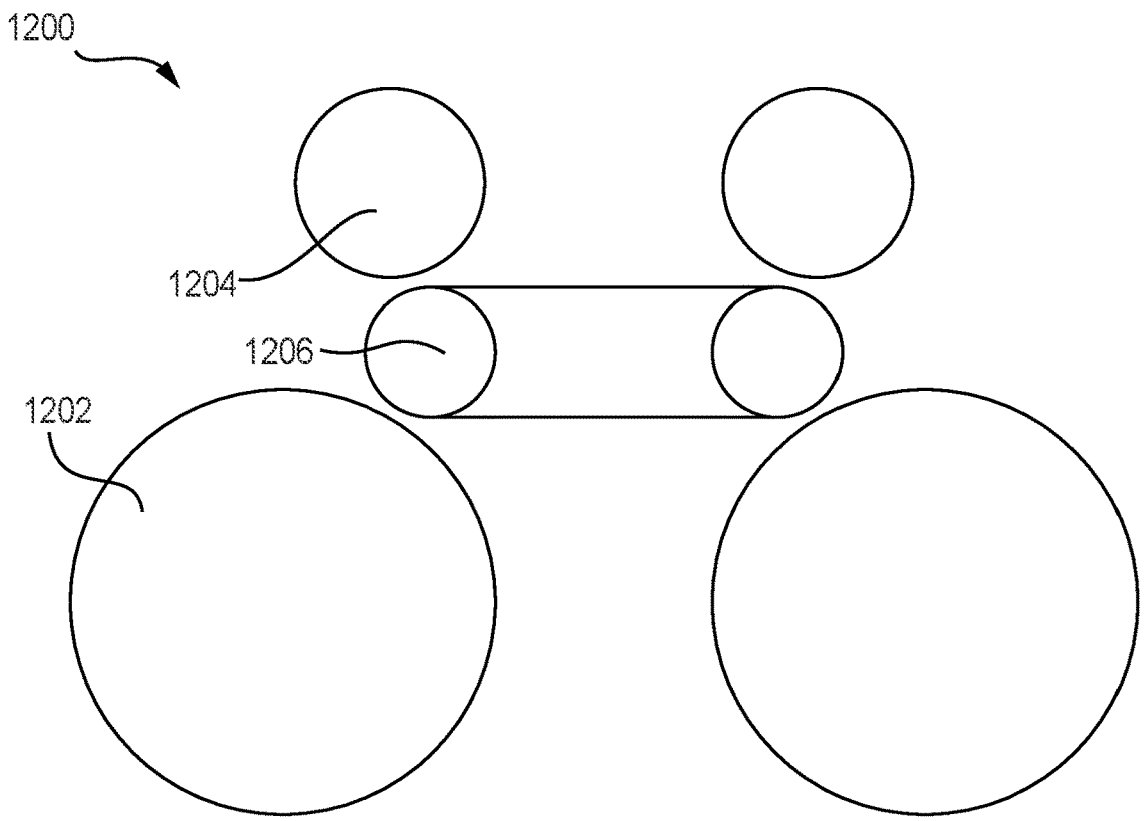
FIG. 12 illustrates arrangements of drive wheels and retainer wheels for use in end units, according to this disclosure.
Figure 12:
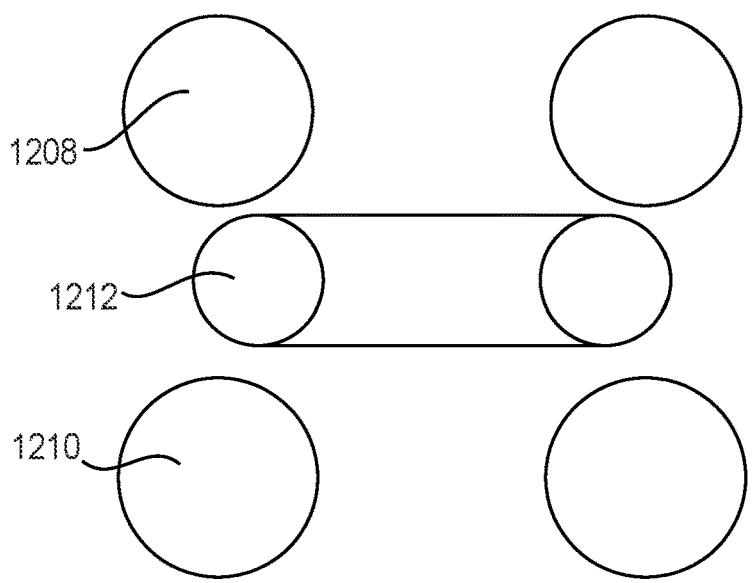

FIG. 12 illustrates arrangements 1200 of drive wheels and retainer wheels for use in end units, according to this disclosure. In some examples, the drive wheels 1202 may have a diameter that is larger than a diameter of the idler wheels 1204. In some examples, the configuration may be opposite, with the drive wheels 1202 having a smaller diameter than the idler wheels. The drive wheels 1202 may have a larger diameter in order to generate a large contact patch with the membrane to impart force to the membrane without tearing the membrane of the torus.

In some examples, a first end unit may have a set of drive wheels 1202 and idler wheels 1204 surrounding the roller assembly 1206 while a second end unit has a first set of idler wheels 1208 and a second set of idler wheels 1210 surrounding the second roller assembly 1212. The idler wheels 1208 and 1210 may have the same, similar, or different diameters. In some examples, the second end unit may also include a set of drive wheels such that the end units work together to drive the conveyor system rather than being driven from a single end.

Figure 13:
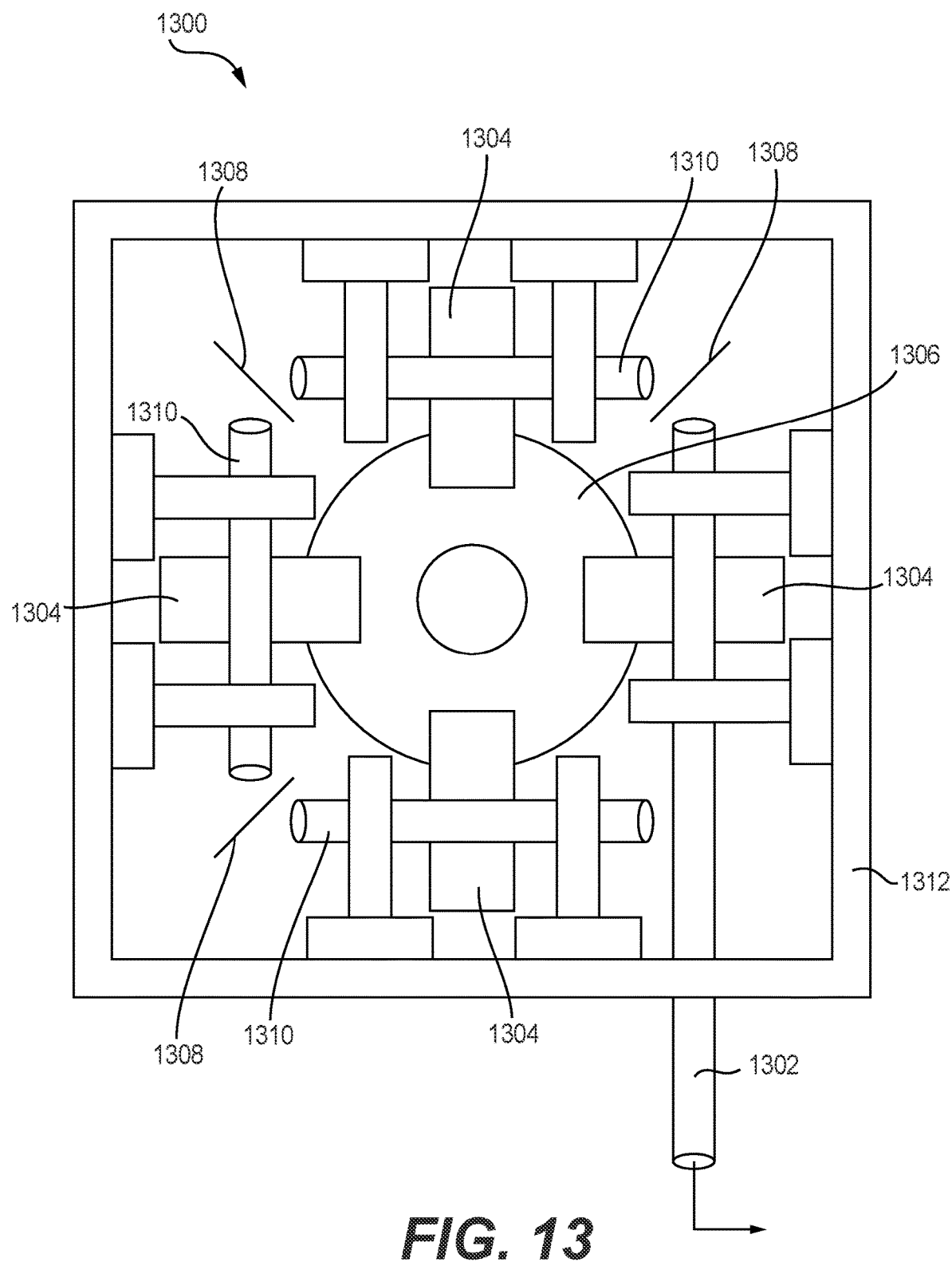
FIG. 13 illustrates a top view of an end unit showing a drive shaft configured to drive the flexible membrane through multiple drive wheels simultaneously, according to this disclosure.

FIG. 13 illustrates a top view of an end unit 1300 showing a drive shaft 1302 configured to drive the flexible membrane forming the torus 1306 through multiple drive wheels simultaneously, according to this disclosure. In the end unit 1300, the drive wheels 1304 are connected to an exterior housing 1312 through supports, as described above, that enable adjustment of the position along the length of the housing 1312. In some examples, the drive wheels 1304 may also be adjustable towards and away from a center of the housing 1312 to change a size of the opening at the torus 1306 and/or adjust the force or contact of the drive wheels 1304 with the torus 1306.

The drive wheels 1304 are supported on shafts 1310 that couple together at joints 1308. The drive shaft 1302 receives an input force and transmits the torque through the first drive wheel and through the joints 1308 to the other drive wheels 1304 such that the drive wheels 1304 may be driven simultaneously and as the same speed using a single input. In this manner, the torus 1306 may receive force from the drive wheels 1304 that is even and uniform around the perimeter of the torus 1306. Though pictured and described herein with four drive wheels around the perimeter of the torus, more or fewer numbers of drive wheels may be used, such as three, five, six, seven, eight, or more drive wheels around the perimeter of the torus 1306.

Figure 14:
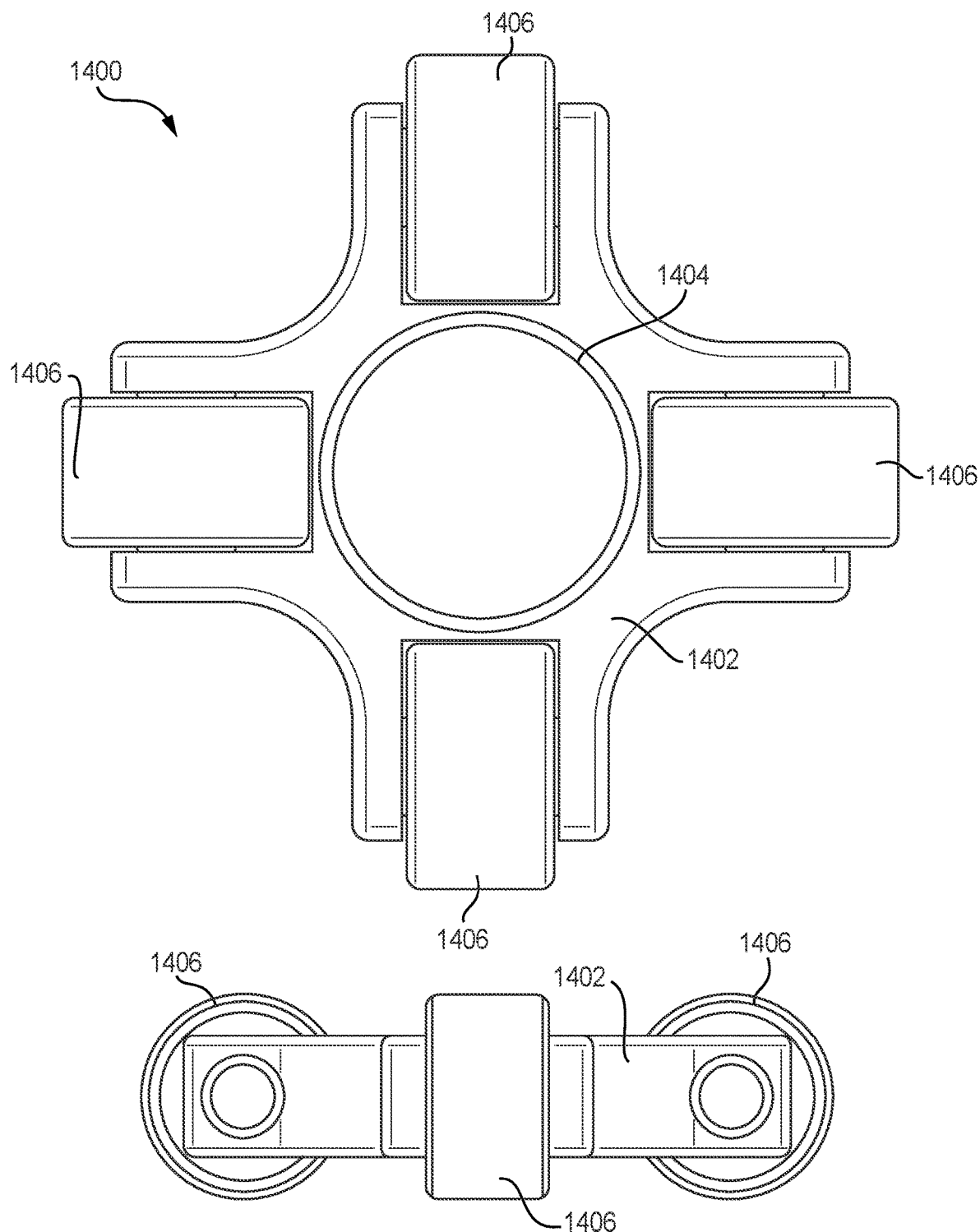
FIG. 14 illustrates an example of a roller block that may be placed within the cavity of the torus for the roller assembly, according to this disclosure.

FIG. 14 illustrates an example of a roller block 1400 that may be placed within the cavity of the torus for the roller assembly, according to this disclosure. The roller block 1400 may be an example of a roller assembly, such as roller assembly 114, roller assembly 504, or other roller assemblies described herein. The roller block 1400 includes a structure 1402 that defines an opening 1404 as well as supports rollers 1406. The roller block 1400 may be placed within the enclosed cavity of the torus as described herein and may provide structure for the end of the conveyor system. The opening 1404 is sized based on a maximum size of an object to be transported. The opening 1404 is where the inner surface of the torus passes through and carries objects along the length of the conveyor. The rollers 1406 may be arranged to correspond and align with the drive wheels and/or idler wheels of the end units as described herein. The rollers 1406 may rest on shafts coupled to the structure 1402 to spin freely. In some examples, the structure 1402 may have other shapes and/or configurations based on specific uses. The structure supports the rollers 1406 such that the rollers 1406 align with the drive wheels and/or idler wheels and maintain the membrane in contact. Accordingly, the rollers 1406 will resist force from the idler wheels and/or drive wheels as applied to the membrane of the torus. The rollers 1406 are free to roll as the torus rotates, to enable the rotation that carries objects along the conveyor system.

The following paragraphs provide examples as described herein, in some examples, the paragraphs and features described therein may be combined with other examples and paragraphs.

A. A conveyance system comprising: a conveyor component having a torus shape elongated along a central axis of the torus shape, the conveyor component including a flexible membrane configured such that a first portion of the flexible membrane is configured to rotate from an interior surface of the torus shape to an exterior surface of the torus shape; a first roller assembly disposed within a cavity enclosed by the flexible membrane; a second roller assembly disposed within the cavity; a first end unit including: a drive shaft configured to receive an input torque, a drive wheel coupled to the drive shaft and configured to rotate in response to the input torque, the drive wheel configured to apply a force against the conveyor component and the first roller assembly, and a first adjustment device that adjusts a position of the drive wheel along a direction parallel with the central axis; and a second end unit including: a retainer wheel that contacts the flexible membrane and applies a force against the flexible membrane and the second roller assembly, and a second adjustment device that adjusts a position of the retainer wheel along the direction parallel with the central axis.

B. The conveyance system of paragraph A, wherein the cavity enclosed by the flexible membrane includes a fluid.

C. The conveyance system of any of paragraphs A-B, further comprising a conduit tube extending from the first end unit to the second end unit, wherein the conveyor component is enclosed by the conduit tube.

D. The conveyance system of any of paragraphs A-C, wherein the conduit tube includes a bearing surface on an interior of the conduit tube, the bearing surface positioned and oriented to contact the conveyor component.

E. The conveyance system of any of paragraphs A-D, wherein: the drive wheel includes a first engagement surface having first engagement features; and the conveyor component includes a second engagement surface having second engagement features configured to interface with the first engagement features.

F. The conveyance system of any of paragraphs A-E, wherein the drive wheel includes a timing belt wheel.

G. The conveyance system of any of paragraphs A-F, wherein the conveyor component further includes a plurality of fins arranged on the flexible membrane, individual fins of the plurality of fins being oriented perpendicular to the central axis of the torus shape.

H. The conveyance system of any of paragraphs A-G, wherein the first roller assembly includes a ring having a plurality of roller surfaces arranged around a perimeter of the ring.

I. The conveyance system of any of paragraphs A-H, wherein the first end unit further includes a second drive wheel connected to the drive shaft and the drive wheel, the second drive wheel configured to contact the conveyor component.

J. A system comprising: a torus-shaped flexible membrane having a central axis, the torus-shaped flexible membrane elongated along a direction parallel to the central axis and having an external surface, center channel, and an enclosed cavity; a first roller assembly disposed within the enclosed cavity; a second roller assembly that applies a force against the external surface and the first roller assembly to cause the torus-shaped flexible membrane to rotate longitudinally around the enclosed cavity to convey objects along the center channel; and an adjustment device that adjusts a position of the second roller assembly along a direction parallel with the central axis.

K. The system of paragraph J, wherein the torus-shaped flexible membrane includes a first engagement surface.

L. The system of any of paragraphs J-K, wherein the second roller assembly includes a second engagement surface configured to interface with the first engagement surface.

M. The system of any of paragraphs J-L, wherein the first engagement surface includes a timing belt applied to a surface of the torus-shaped flexible membrane and the second roller assembly includes a timing belt wheel.

N. The system of any of paragraphs J-M, wherein the enclosed cavity contains a fluid.

O. The system of any of paragraphs J-N, further comprising a conduit tube enclosing the torus-shaped flexible membrane.

P. The system of any of paragraphs J-O, wherein the conduit tube comprises a plurality of bearings on an internal surface of the conduit tube, the plurality of bearings positioned and oriented to contact the torus-shaped flexible membrane to reduce friction between the torus-shaped flexible membrane and the conduit tube.

Q. The system of any of paragraphs J-P, wherein the first roller assembly is positioned at a first end of the torus-shaped flexible membrane, the system further comprising: a third roller assembly situated within the enclosed cavity at a second end of the torus-shaped flexible membrane; and a fourth roller assembly that applies a force against the external surface and the third roller assembly to maintain a fixed distance between the first roller assembly and the third roller assembly.

R. A conveyance system comprising: a torus-shaped flexible membrane having a central axis, the torus-shaped flexible membrane elongated along a direction parallel to the central axis and having an external surface, center channel, and an enclosed cavity; a first roller block positioned within the enclosed cavity at a first end of the torus-shaped flexible membrane; a second roller block positioned within the enclosed cavity at a second end of the torus-shaped flexible membrane; a first end unit coupled to the torus-shaped flexible membrane at the first end, the first end unit contacting the first roller block to maintain the first roller block at a first position and applying a force against the external surface to cause the center channel to advance along the central axis; and a second end unit coupled to the torus-shaped flexible membrane at the second end, the second end unit contacting the second roller block to maintain the second roller block at a second position and maintaining a distance between the first position and the second position.

S. The conveyance system of paragraph R, further comprising a conduit extending from the first end unit to the second end unit, the conduit surrounding the torus-shaped flexible membrane and comprising a low-friction surface on an interior of the conduit.

T. The conveyance system of any of paragraphs R-S, further comprising a plurality of fins arranged on a surface of the torus-shaped flexible membrane, individual fins of the plurality of fins perpendicular to the central axis.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims.

What is claimed is:

1. A conveyance system comprising:
   a conveyor component having a torus shape elongated along a central axis of the torus shape, the conveyor component including a flexible membrane configured such that a first portion of the flexible membrane is configured to rotate from an interior surface of the torus shape to an exterior surface of the torus shape;
   a first roller assembly disposed within a cavity enclosed by the flexible membrane;
   a second roller assembly disposed within the cavity;
   a first end unit including:
      a drive shaft configured to receive an input torque,
      a drive wheel coupled to the drive shaft and configured to rotate in response to the input torque, the drive wheel configured to apply a force against the conveyor component and the first roller assembly, and
      a first adjustment device that adjusts a position of the drive wheel along a direction parallel with the central axis; and
   a second end unit including:
      a retainer wheel that contacts the flexible membrane and applies a force against the flexible membrane and the second roller assembly, and
      a second adjustment device that adjusts a position of the retainer wheel along the direction parallel with the central axis.

2. The conveyance system of claim 1, wherein the cavity enclosed by the flexible membrane includes a fluid.

3. The conveyance system of claim 1, further comprising a conduit tube extending from the first end unit to the second end unit, wherein the conveyor component is enclosed by the conduit tube.

4. The conveyance system of claim 3, wherein the conduit tube includes a bearing surface on an interior of the conduit tube, the bearing surface positioned and oriented to contact the conveyor component.

5. The conveyance system of claim 1, wherein:
   the drive wheel includes a first engagement surface having first engagement features; and
   the conveyor component includes a second engagement surface having second engagement features configured to interface with the first engagement features.

6. The conveyance system of claim 5, wherein the drive wheel includes a timing belt wheel.

7. The conveyance system of claim 1, wherein the conveyor component further includes a plurality of fins arranged on the flexible membrane, individual fins of the plurality of fins being oriented perpendicular to the central axis of the torus shape.

8. The conveyance system of claim 1, wherein the first roller assembly includes a ring having a plurality of roller surfaces arranged around a perimeter of the ring.

9. The conveyance system of claim 1, wherein the first end unit further includes a second drive wheel connected to the drive shaft and the drive wheel, the second drive wheel configured to contact the conveyor component.

10. A system comprising:
    a torus-shaped flexible membrane having a central axis, the torus-shaped flexible membrane elongated along a direction parallel to the central axis and having an external surface, center channel, and an enclosed cavity;
    a first roller assembly disposed within the enclosed cavity;
    a second roller assembly that applies a force against the external surface and the first roller assembly to cause the torus-shaped flexible membrane to rotate longitudinally around the enclosed cavity to convey objects along the center channel;
    an end unit including:
       a drive shaft configured to receive an input torque,
       a drive wheel coupled to the drive shaft and configured to rotate in response to the input torque, the drive wheel configured to apply a force against the torus-shaped flexible membrane and the first roller assembly, and
    an adjustment device that adjusts a position of the second roller assembly along a direction parallel with the central axis.

11. The system of claim 10, wherein the torus-shaped flexible membrane includes a first engagement surface.

12. The system of claim 11, wherein the second roller assembly includes a second engagement surface configured to interface with the first engagement surface.

13. The system of claim 12, wherein the first engagement surface includes a timing belt applied to a surface of the torus-shaped flexible membrane and the second roller assembly includes a timing belt wheel.

14. The system of claim 10, wherein the enclosed cavity contains a fluid.

15. The system of claim 10, further comprising a conduit tube enclosing the torus-shaped flexible membrane.

16. The system of claim 15, wherein the conduit tube comprises a plurality of bearings on an internal surface of the conduit tube, the plurality of bearings positioned and oriented to contact the torus-shaped flexible membrane to reduce friction between the torus-shaped flexible membrane and the conduit tube.

17. The system of claim 10, wherein the first roller assembly is positioned at a first end of the torus-shaped flexible membrane, the system further comprising:
    a third roller assembly situated within the enclosed cavity at a second end of the torus-shaped flexible membrane; and
    a fourth roller assembly that applies a force against the external surface and the third roller assembly to maintain a fixed distance between the first roller assembly and the third roller assembly.

18. A conveyance system comprising:
a torus-shaped flexible membrane having a central axis, the torus-shaped flexible membrane elongated along a direction parallel to the central axis and having an external surface, center channel, and an enclosed cavity;
a first roller block positioned within the enclosed cavity at a first end of the torus-shaped flexible membrane;
a second roller block positioned within the enclosed cavity at a second end of the torus-shaped flexible membrane;
a first end unit coupled to the torus-shaped flexible membrane at the first end, the first end unit contacting the first roller block to maintain the first roller block at a first position and applying a force against the external surface to cause the center channel to advance along the central axis; and
a second end unit coupled to the torus-shaped flexible membrane at the second end, the second end unit contacting the second roller block to maintain the second roller block at a second position and maintaining a distance between the first position and the second position.

19. The conveyance system of claim 18, further comprising a conduit extending from the first end unit to the second end unit, the conduit surrounding the torus-shaped flexible membrane and comprising a low-friction surface on an interior of the conduit.

20. The conveyance system of claim 18, further comprising a plurality of fins arranged on a surface of the torus-shaped flexible membrane, individual fins of the plurality of fins perpendicular to the central axis.

* * * * *